United States Patent
Ball

(10) Patent No.: US 6,300,789 B1
(45) Date of Patent: Oct. 9, 2001

(54) DYNAMIC TERMINATION FOR NON-SYMMETRIC TRANSMISSION LINE NETWORK TOPOLOGIES

(75) Inventor: Zane A. Ball, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/469,220

(22) Filed: Dec. 22, 1999

(51) Int. Cl.[7] .................................................. H03K 17/16
(52) U.S. Cl. ............................... 326/30; 326/83; 326/86; 710/101; 710/126
(58) Field of Search ................................ 326/30, 26, 21, 326/27, 83, 86

(56) References Cited

U.S. PATENT DOCUMENTS

| | | | |
|---|---|---|---|
| 5,990,701 | * 11/1999 | Star | 326/30 |
| 6,029,216 | * 2/2000 | Hoglund et al. | 710/101 |
| 6,087,847 | * 7/2000 | Mooney et al. | 326/30 |
| 6,108,740 | * 8/2000 | Caldwell | 710/126 |
| 6,115,773 | * 9/2000 | Capps, Jr. et al. | 710/129 |
| 6,118,310 | * 9/2000 | Esch, Jr. | 327/108 |
| 6,163,165 | * 12/2000 | Starr | 326/30 |

* cited by examiner

Primary Examiner—Michael Tokar
Assistant Examiner—Vibol Tan

(57) ABSTRACT

In order to terminate a non-symmetric transmission line having at least three terminations to which chips are coupled in a way which will attain impedance matching, the termination impedances at the chips are dynamically changed according to the topology of the network and which chip is driving the transmission line.

16 Claims, 3 Drawing Sheets

DYNAMIC TERMINATION FOR NON-SYMMETRIC TRANSMISSION LINE NETWORK TOPOLOGIES

BACKGROUND OF THE INVENTION

1. Field of the Invention

The present invention relates to termination of transmission lines in general and more particularly termination of non-symmetric transmission lines.

2. Description of the Prior Art

Termination of a transmission line such as a high speed interconnect or bus is often used to increase performance through reduction or elimination of reflections. To accomplish this, a digitally controlled impedance driver can be used as a parallel termination, for example, by driving a '1' state onto the bus in unidirectional mode. It is also possible use a similar type of termination but turn on both PMOS and NMOS transistors for a center tapped termination (CTT) type scheme also utilizing the digitally controlled impedance of the driver to match the line impedance.

Examples of such digitally controlled impedance are found in U.S. Pat. No. 5,898,321 and in PCT application WO 99/06845, both of which are assigned to the same assignee as the present invention. Thus, for example, in U.S. Pat. No. 5,898,321, there is included, among other things, a compensation unit which provides an impedance control signal to impedance compensation circuit. This circuit uses a combination of logic and PMOS and NMOS transistors in a center tapped termination scheme to adjust the impedance. Typically in the prior art such termination was included only at one end of the transmission line.

An ideal transmission line has an impedance Zo which when terminated with an identical load impedance Z=Zo will have a reflection coefficient of zero and is the best case for high performance interconnects. However, for example, in a multi-load bus, i.e., a bifurcated bus deviates from this ideal since to terminate one load correctly is to leave another unterminated. Often a scheme is used to approximate the point to point scheme. An embodiment of such an arrangement having a balanced topology is shown in FIG. 1. A transmission line is driven at one end by a driver 12 through an impedance of approximately Zo. At the other end of transmission line are two short balanced stubs 16 and 18 terminated respectively by impedances 20 and 22.

In one embodiment the driver 12 is in a processor integrated circuit (commonly called a chip) 24. The transmission line 10 may be part of a long bus (e.g., ~10 cm) that ends in two short balanced stubs 16 and 18 (e.g., ~1 cm). When the processor chip 24 is driving (with a driver 12 impedance 14 of ~Zo, matched to the transmission line 10) it is best to terminate each of the two electrically short stubs 16 and 18 with a termination impedance of ~2Zo such that the parallel combination of the two is ~Zo which gives a good approximation to an ideal terminated transmission line and should yield performance similar to that of a point to point bus. This parallel combination approximation is valid when the length of the stub is much smaller than the length the signal propagates during its rise time.

This arrangement works well in solving the problem associated with a bifurcated transmission line where driving takes place at only the one end. However, cases exist where a chip on one or both of the balanced T stubs wishes to drive the bus. These chips at the terminations of stubs 16 and 18 of FIG. 1 may be, for example, caches.

In the scheme of FIG. 1, with, for example, a processor chip 24 at the long end of transmission line 10 and a first cache chip 20 which is driving the transmission line 10 through stub 16, it and the second cache chip 22 will both be terminated with an impedance of 2 Zo. However the condition for the parallel combination (that the length of the stub is much smaller than the length the signal propagates during its rise time) is clearly not met since the two chips are very far apart. The essential fact is that the best termination scheme will be different depending on which chip is driving the bus, and this will be true for any non-symmetric bifurcated transmission line network.

Thus, in the example of FIG. 2, if the first cache chip 20 is driving the bus, using the prior scheme of having an impedance of Zo at the driving end and an impedances of 2 Zo at the receiving ends, it is clear that of mismatch will result. This then is an non-symmetric transmission line. A transmission line is non-symmetric when the networks response varies according to which device is driving the network.

SUMMARY OF THE INVENTION

In an embodiment of the present invention, a non-symmetric transmission line, having at least three terminations to which chips are coupled, is terminated by dynamically changing termination impedances at the chips according to the topology of the network and which chip is driving the transmission line.

DETAILED DESCRIPTION

Embodiments of the present invention provide dynamic termination of a non-symmetric transmission line, having at least three terminations, based on the use of digital impedance control mechanisms adapted to dynamically change the termination scheme based on which agent is driving the bus. In order to implement this scheme, it is necessary to know which driver, i.e., a driver at the end of a long transmission line or one at one of a number of stubs, for example, is driving the line. Embodiments of the present invention can be used in any situation where three or more chips are coupled by high speed transmission lines. One example of such are the lines in a high speed bus. In that case the different chips may comprise bus agents.

Embodiments of the present invention make use of the fact that in current computer systems, the various bus agents know which agent is driving the bus at any given time. In an embodiment where there are a number of agents such as a processor and two caches coupled to the bus, each agent on the bus 'knows' which agent (or perhaps which of a subset of the agents, e.g. cache or processor) has control of the bus. That is to say each of the agents may have processing capability and can execute a program to control impedance. Alternatively, where one agent is a processor, it can send information for impedance control to the other bus agents over the bus. An example of a network where information can be passed from agent to agent is a token ring network. Thus, using information concerning which agent is controlling the bus and knowledge of bus topology, the embodiments described below can dynamically control impedances at all of the terminations.

Figure 3:
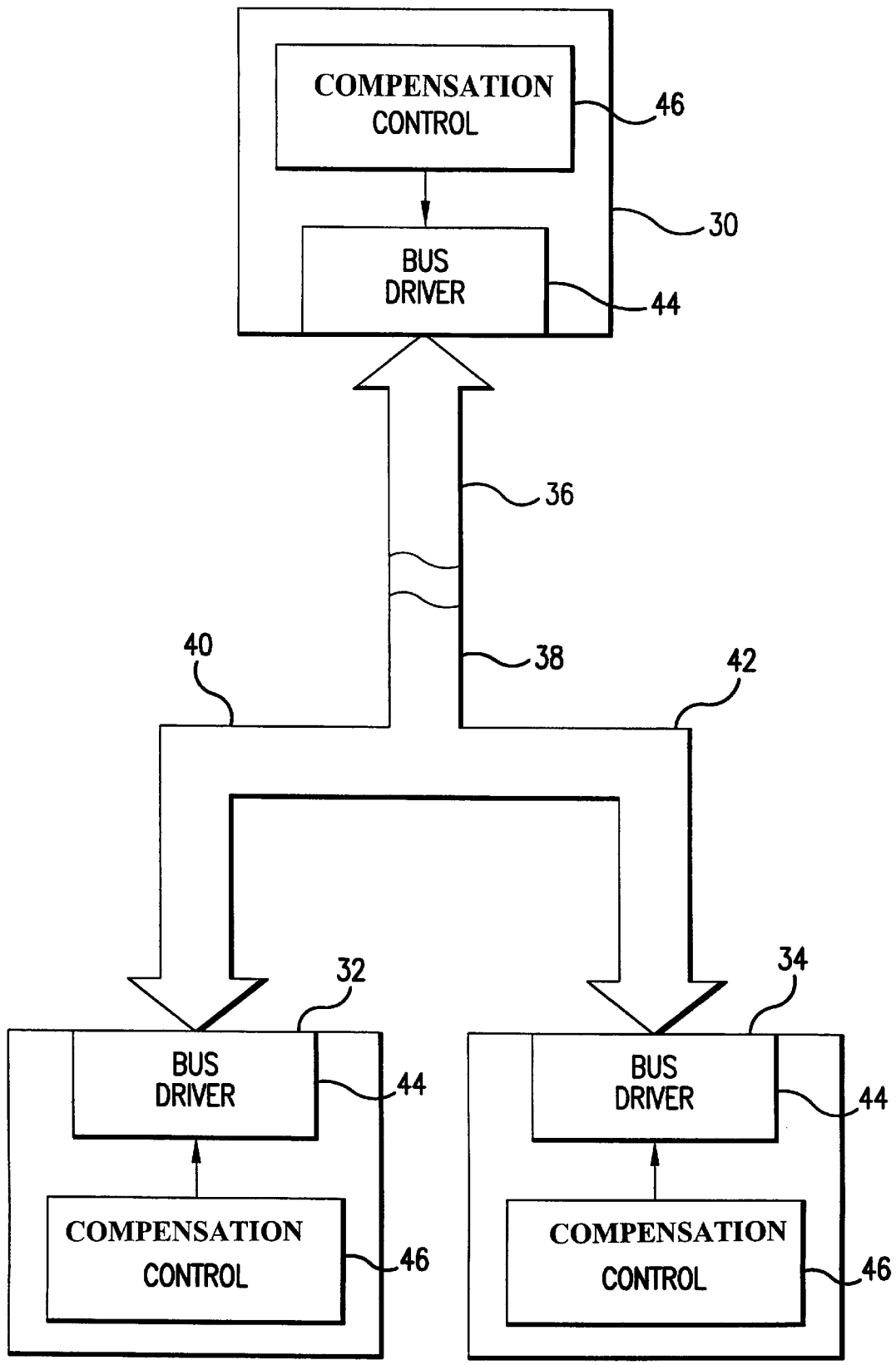
FIG. 3 is a block diagram of an arrangement in which embodiments of the present invention can be employed.

FIG. 3 is a block diagram showing an arrangement in which embodiments of the present invention may be employed. In the arrangement of FIG. 3, three bus agents are provided in an non-symmetric arrangement with a long section of transmission line and balanced stubs such as described above. Of course, more than three terminations may be provided and any stubs need not be balanced. In FIG. 3, for example, bus agent 30 may be a processor chip and bus agents 32 and 34 may be cache chips. A bus 36 interconnects the agents 30, 32, and 34. Bus 36 includes a long portion 38 and two stubs 40 and 42. Each of the agents includes a bus driver 44 which includes a controllable impedance, and a compensation control 46 unit supplying control signals to the driver. These elements may be constructed in the manner described in the prior art mentioned above.

As is apparent from the aforementioned prior art, the disclosed impedance matching circuitry responds to a bit pattern, of, for example, four or five bits. Typically, this bit pattern is adjusted every few cycles to match a driver impedance to an external resistor (which is nominally the transmission line impedance). Using this bit pattern as a reference, compensation control 46 unit may generate other impedances which are multiples of the Zo value of the transmission. In general a multiples is not limited to whole number multiples but can also include fractional multiples. In embodiments of the present invention using this approach, a good approximation to the terminated point to point scheme in both directions can be obtained, enhancing performance. That is to say, for each bus agent, based on knowledge of which agent is controlling the bus and its topology, and using a stored program, processing using a stored program is carried out to determine a bit pattern to set the proper impedance needed for a good match. The processing can be carried out at a central unit such as the processor bus agent 30 or individually at each bus agent. Other schemes for deciding the proper termination impedance may also be used. What is done in each case is to dynamically adjust the impedance at each termination based on which agent is driving the bus.

Figure 1:
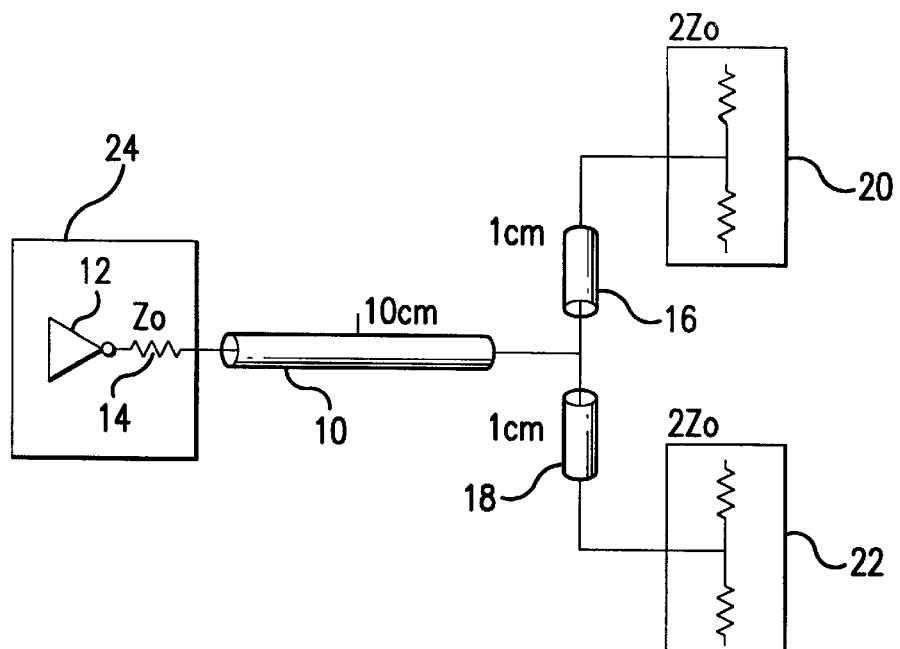
FIG. 1 is a schematic diagram of a prior art scheme of terminating a bifurcated transmission with a processor driving one and balanced stubs at the other.
Figure 2:
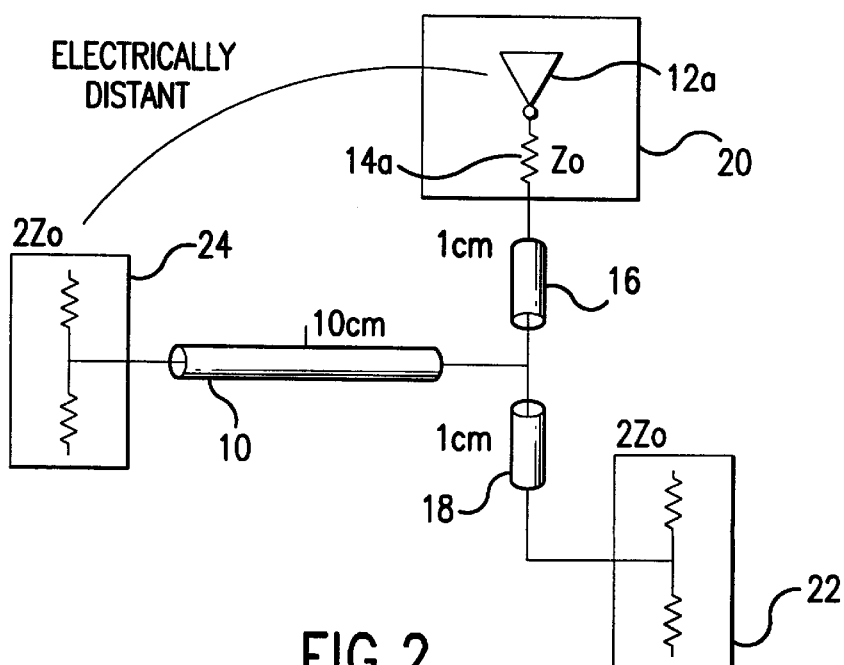
FIG. 2 is a schematic diagram illustrating this scheme applied to the same transmission line where a chip at one of the stubs is driving the transmission line.
Figure 4:
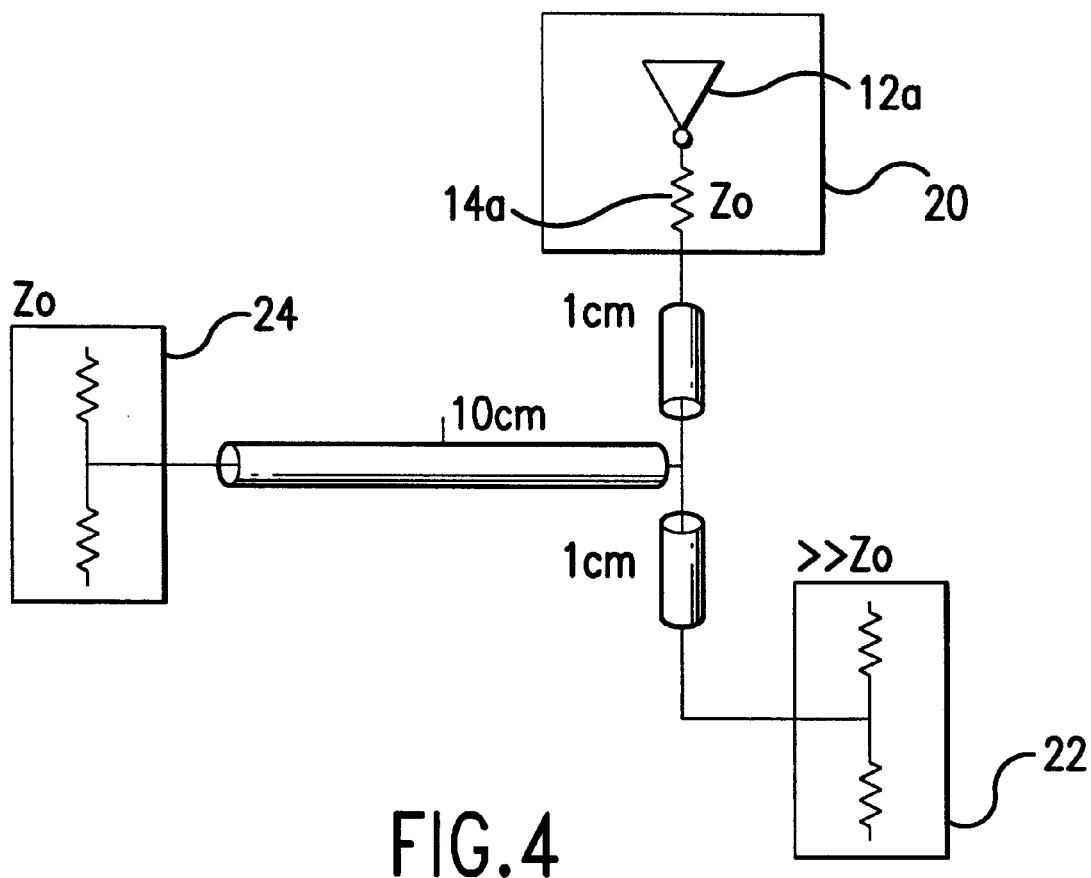
FIG. 4 is a schematic diagram of an embodiment of a termination scheme according to the present invention.

Thus, for example, as shown in the schematic diagram of FIG. 4, showing one of the transmission lines in the bus 36, and corresponding to the arrangement of FIG. 1, when the bus control is with the cache chip 20 proper termination becomes possible. With the transmission line being driven by the driver 12a, the impedance 14a, which in FIG. 1 was 2 Zo can be adjusted to the appropriate value of Zo. The impedance of the termination at the processor chip 24 is kept at Zo. In this arrangement there is no longer a balanced T at the termination end. To have a proper match, this requires that the impedance at cache chip 22, be adjusted to be much greater than Zo. All of these adjustments are done dynamically by the impedance control circuits discussed above in connection with the FIG. 3.

The embodiment of the present invention for the balanced T illustrated herein, shows the performance enhancements possible with this kind of technology. However the advantage of increased flexibility is equally important. If, for example, it was desired to add two more cache chips to the balanced T topology shown in FIG. 1, the old scheme would not work, requiring changes be made to the silicon. However, with embodiments of the dynamic and digitally controlled impedance of the present invention, it would simply be necessary adjust the impedance of the stubs to 4Zo when the processor chip is driving and set them all to a high impedance state when one of the cache chips is driving with the processor chip remaining at a matched impedance. Furthermore, with the available flexibility the stubs, in whatever number provided, need not be balanced.

The flexibility also allows for optimization. If, for example, it was found once the product was built that the termination scheme was not optimal, then the bus could be re-programmed to change the scheme. Such changes could easily be implemented as a knob setting controlled by the BIOS, microcode or even software. This might be desirable if the agents are to be connected in different topologies depending on the product such as single as compared to dual as compared to 4 way multiprocessor systems. These are only examples; other arrangements are also possible. For example, even beyond microprocessors, application of embodiments of the present invention to free topology networks which would self adjust their termination impedance based on software can also be envisioned.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A method of terminating a non-symmetric transmission line, having at least three terminations to which chips are coupled, at least two of the terminations being at stubs on one end of the transmission line and a third termination at the other end of the transmission line, comprising dynamically changing termination impedances at said chips according to the topology of the network and which chip is driving the transmission line such that, for an impedance of said transmission line that is Zo, the termination impedance at said chip at said third termination is set to approximately Zo, the termination impedance at the chips at each of said at least two terminations is set to approximately NZo, where N equals the number of stubs when said stubs are receiving, and, when one of said chips at one of said stubs is driving its impedance is set to approximately Zo and that of the chips at the other stubs to a value much greater than Zo.

2. A method of terminating a non-symmetric transmission line according to claim 1 wherein one of said chips comprises a processor.

3. A method of terminating a non-symmetric transmission line according to claim 2 wherein one of said chips comprises a cache.

4. A method of terminating a non-symmetric transmission line according to claim 1 wherein one of said chips comprises a cache.

5. A method of terminating a non-symmetric transmission line according to claim 2 wherein said processor chip is at said third termination of said transmission line and a cache chip is coupled to each of said two stubs.

6. A method of terminating a non-symmetric transmission line according to claim 5 wherein said transmission line is in a bus.

7. Apparatus for terminating a non-symmetric transmission line, having at least three terminations to which chips are coupled, at least two of the terminations being at stubs on one end of the transmission line and a third termination at the other end of the transmission line, comprising, at each termination:

a driver which includes a controllable impedance;

a compensation control unit coupled to and controlling said controllable impedance, said control unit programmed to dynamically change termination impedances at said chips according to the topology of the network and which chip is driving the transmission line such that, for an impedance of said transmission line that is Zo, the termination impedance at said chip at said third termination is set to approximately Zo, the termination impedance at the chips at each of said at least two terminations is set to approximately Nzo, where N equals the number of stubs when said stubs are receiving, and, when one of said chips at one of said stubs is driving its impedance is set to approximately Zo and that of the chips at the other stubs to a value much greater than Zo.

8. Apparatus for terminating a non-symmetric transmission line according to claim 7 wherein one of said chips comprises a processor.

9. Apparatus for terminating a non-symmetric transmission line according to claim 8 wherein one of said chips comprises a cache.

10. Apparatus for terminating a non-symmetric transmission line according to claim 8 wherein said processor chip is at said third termination of said transmission line and a cache chip is coupled to each of said two stubs.

11. Apparatus for terminating a non-symmetric transmission line according to claim 7 wherein one of said chips comprises a cache.

12. Apparatus for terminating a non-symmetric transmission line according to claim 7 wherein said transmission line is in a bus.

13. Apparatus for terminating a non-symmetric transmission line according to claim 7 wherein each of said controllable impedances receives a plurality of digital bits to control the termination impedance.

14. A computer system comprising:
    a. a processor chip;
    b. a first cache chip;
    c. a second cache chip; and
    d. a non-symmetric bus having at least two terminations in the form of stubs on one end and a third termination at the other end, said first cache and second cache chips coupled to terminations at said stub and said processor to said third termination, each of said processor, first cache and second cache chips including:
    e. a driver which includes a controllable impedance; and
    f. a compensation control unit coupled to and controlling said controllable impedance, said control unit programmed to dynamically change termination impedances at said chips according to the topology of the network and which chip is driving the bus such that for an impedance of said bus that is Zo, the termination impedance at said processor chip is set to approximately Zo, the termination impedance at the cache chips at each of said at least two terminations is set to approximately NZo, where N equals the number of stubs when said stubs are receiving, and, when one of said cache chips at one of said stubs is driving, its impedance is set to approximately Zo and that of the chips at the other stubs to a value much greater than Zo.

15. A computer system according to claim 14 wherein each of said controllable impedances receives a plurality of digital bits to control the termination impedance.

16. A computer readable medium having stored thereon instructions that, when executed by a processor, causes the processor to change a termination impedance at a chip which is coupled to other chips in a network via an unsymmetric transmission line having at least termination, at least two of the terminations being at stubs on one end of the transmission line and a third termination at the other end of the transmission line, according to the topology of the network to and which chip is driving the transmission line such that for an impedance of said transmission line that is Zo, the termination impedance at the chip at said third termination is set to approximately Zo, the termination impedance at the chips at each of said at least two terminations is set to approximately NZo, where N equals the number of stubs when said stubs are receiving, and, when one of said chips at one of said stubs is driving its impedance is set to approximately Zo and that of the chips at the other stubs to a value much greater than Zo.

* * * * *